(12) United States Patent
Hotz

(10) Patent No.: US 6,839,681 B1
(45) Date of Patent: Jan. 4, 2005

(54) PERFORMANCE MEASUREMENT METHOD FOR PUBLIC RELATIONS, ADVERTISING AND SALES EVENTS

(75) Inventor: Lawrence Hotz, New Rochelle, NY (US)

(73) Assignee: Right Angle Research LLC, New Rochelle, NY (US)

( * ) Notice: Subject to any disclaimer, the term of this patent is extended or adjusted under 35 U.S.C. 154(b) by 655 days.

(21) Appl. No.: 09/605,412

(22) Filed: Jun. 28, 2000

(51) Int. Cl.[7] .............................................. G06F 17/60
(52) U.S. Cl. ......................................................... 705/10
(58) Field of Search .......................................... 705/10

(56) References Cited

U.S. PATENT DOCUMENTS

| | | | | |
|---|---|---|---|---|
| 5,057,915 A | * | 10/1991 | Von Kohorn | 463/9 |
| 5,227,874 A | * | 7/1993 | Von Kohorn | 705/10 |
| 5,809,481 A | * | 9/1998 | Baron et al. | 705/14 |
| 5,857,175 A | * | 1/1999 | Day et al. | 705/14 |
| 5,992,888 A | * | 11/1999 | North et al. | 283/56 |
| 6,061,691 A | * | 5/2000 | Fox | 707/104.1 |
| 6,078,892 A | * | 6/2000 | Anderson et al. | 705/10 |
| 6,286,005 B1 | * | 9/2001 | Cannon | 707/100 |
| 6,553,404 B2 | * | 4/2003 | Stern | 709/203 |

FOREIGN PATENT DOCUMENTS

JP 2000048070 A * 2/2000 ........... G06F/17/60

OTHER PUBLICATIONS

Stevens, Mike. "Direct Marketing: Plugged into the Public," Marketing, Jan. 21, 1988 [Proquest].*
"Section 2: Customer relations," The Journal of Product and Brand Management, 1996 [Proquest].*
Kuttner, Robert. "Will the Web Become a Paying Proposition? . . ." The Los Angeles Times, May 27, 1996 [Proquest].*

* cited by examiner

Primary Examiner—Susanna M. Diaz
Assistant Examiner—Catherine M. Colón
(74) Attorney, Agent, or Firm—Katten Muchin Zavis Rosenman

(57) ABSTRACT

The present invention is a system and method for the evaluation and measurement of the performance of public relations, advertising and sales events to a particular user in order to provide value added relevance to marketing information. The invention provides a computer based means consolidating in an easily accessed format, information that has relevance to the marketing process of a particular brand or product and the performance measurement of a plurality of public relations events.

34 Claims, 9 Drawing Sheets

PERFORMANCE MEASUREMENT METHOD FOR PUBLIC RELATIONS, ADVERTISING AND SALES EVENTS

TECHNICAL FIELD OF THE INVENTION

The present invention generally relates to the evaluation and measurement of the performance of public relations, advertising and sales events to a particular user in order to provide value added relevance to marketing information.

BACKGROUND OF THE INVENTION

The disciplines available to a marketing professional to promote sales of a particular product or brand are broadly categorized as advertising or public relations. Advertising refers to the informational print or broadcast solicitations designed to encourage the purchase of an item or create brand awareness. Advertising is useful to the marketing professional because it can be purchased for placement in a particular media, at a particular time and targeted to a particular audience. Public relations activities include encouraging and assisting in the placement of editorial events that occur in the various media, including print, radio and television and are not under the direct control of the marketing professional. It is well known in the retail industry that the presentation to the general public of a brand or product is more effective through an editorial rather than advertisement because the opinion or endorsement of an independent third party is inherently more believable by the public and therefore more valuable as a marketing tool for a retailer. Consequently a favorable editorial review is highly valued by the marketing professional. Furthermore, public relations events due to their inherent credibility are particularly useful to enhance or maintain the reputation of an image conscience retailer. Several problems exist however for the marketing professional with regard to the presentation of a product by way of an editorial event. In contrast to an advertisement, an editorial event can appear in any media, at any time and be viewed by a disparate audience. Furthermore, it is difficult if not impossible for the marketing professional to gauge the effectiveness of an editorial event as reflected in sales of a product or even in relation to an advertisement for the same product. Moreover, while the cost of a particular advertisement or advertising program is known by the company placing the advertisement, the value and effectiveness of public relations work performed in support of editorial events is less apparent. There is a lack of means to evaluate the effectiveness of an editorial event and even fewer means to compare the relative effectiveness of a plurality of editorial events to each other or to advertising.

Attempts to provide an objective measure of the marketing value of advertising and public relations events has up to now, not been very effective. The most prevalent method of measuring the effectiveness of advertising has been through the use of market research. Market research companies, exemplified by "The Arbitron Company", "ACNielsen Company" and "Media Metrix" and "NetRatings" can be most generally described as providing statistical surveys of consumer behavior which includes; radio listening, television viewing, Internet usage, consumer purchasing and demographic data. This data can be used for setting advertising rates for radio and television and for tracking consumer behavior with respect to a particular company or product. However, market research firms lack the capability of measuring and analyzing the actual impact and impression created by a public relations campaign on an audience. Furthermore, market research does not compare editorial events to advertising or gauge their effect on sales.

Also available to the marketing professional are services that report the estimated value for advertising purchased for a particular product or brand. Companies such as Publishers Information Bureau exemplify these services. While this information can be useful to assess the relative exposure of a product or brand in the marketplace it provides no measure of the effectiveness of the advertisements nor does it include any information with regard to public relations activities. Likewise, demographic information from companies such as Audit Bureau Circulations is available that can provide data regarding the exposure of a particular advertisement, consumer behavior or consumer status. However, the companies that provide this information provide no means with which to analyze the performance of a particular editorial event.

In addition to the fact that the current tools available for the performance evaluation of editorial events are inadequate to obtain a true picture of the worth of an editorial event there also exists the problem that current sources of information do not provide as potential user with the capability of viewing a comprehensive report analyzing a plurality of editorial events for a product and brand.

A need therefore exist for a performance measurement method for public relations events, having the capability to consolidate in one place evaluations of the effectiveness of public relations activities and advertisements particularly with regard to sales

SUMMARY OF THE INVENTION

It is an object of the present invention to provide a method of performance measurement for public relations events.

It is an object of the present invention to provide a method for consolidating information regarding editorial events for evaluation of the marketing relevance of public relations events.

It is an object of the present invention to provide a method to integrate and compare on an equivalent basis the effectiveness of advertising and public relations events.

It is a further object of the present invention to provide a method of evaluating multiple media events to determine their public relations and sales significance.

Thus according to the principles of the invention, there is provided a method of doing business and a system for gathering a plurality of advertising, sales and editorial events having significance to a defined customer, indexing the advertising, sales and editorial events for an electronic database and abstracting predefined portions thereof for inclusion in the database, evaluating the value of each of the advertising, sales and editorial references to the defined customer, providing electronic access to said database and generating at least one report summarizing a plurality of advertising sales and editorial events.

Further features and advantages of the invention as well as the structure and operation of the preferred embodiments of the present invention are described in detail below with reference to the accompanying drawings. In the drawings, like numbers indicate identical or functionally similar elements.

BRIEF DESCRIPTION OF THE DRAWINGS

Preferred embodiments of the present invention will now be described, by way of example only, with reference to the accompanying drawings in which:

FIG. 3 is an exemplary web page of the present invention depicting an electronic form wherein the user can define the parameters of a search.

FIG. 4 is an exemplary web page of the present invention depicting a search report.

DETAILED DESCRIPTION OF THE PREFERRED EMBODIMENT OF THE INVENTION

Figure 1:
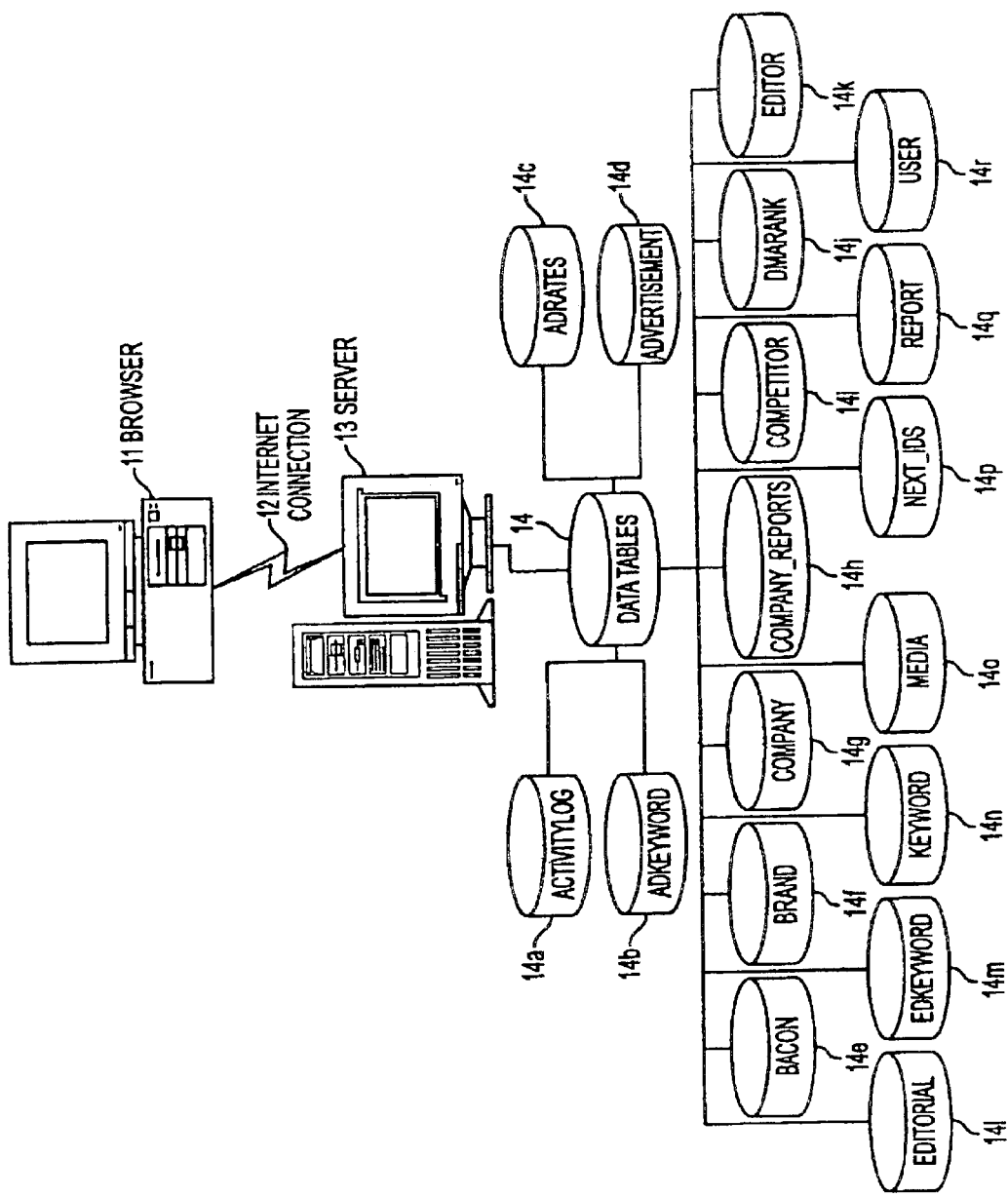
FIG. 1 is an exemplary block diagram that depicts the structure of the system embodying the present invention.

The present invention is directed to a method and a system, for providing performance measurements of public relations, advertising and sales events to a particular user in order to provide value added relevance to marketing information.

In an exemplary embodiment the present invention provides a method and system for consolidating information that has relevance to the marketing process of a brand of goods or product and the performance measurement of public relations events related to those goods and products.

In order to use the features of the present invention, a user will be provided with an identification name and password with which to use to access the website embodying the present invention. In the event that a corporation subscribes to the service the corporation can be provided with a corporate identification name and password as well as a plurality of identification names and passwords for individual users within the corporation. In that way a corporation can enable a number of marketing professionals to access the marketing information of the present invention from diverse locations. Marketing professionals in various geographic locations or working on different projects will be able to access data regarding a plurality of marketing campaigns to compare and contrast the effectiveness of the marketing strategies and thus utilize the data provided by the present invention to plan future marketing events.

To implement the present invention a user subscribes to the service provided by the invention by specifying the brands and categories of products for which editorial events should be monitored, reviewed and gathered. In addition, the user must specify the, brands and products that compete with its own merchandise in the same retail category and the media that should be reviewed for editorial events. In that way, research can be undertaken to gather a plurality of advertising, sales and editorial events having significance to a defined customer, and indexed and evaluated for display to the user. Information regarding a plurality of advertising, sales and editorial events having significance to a defined customer are gathered from a variety of sources, including print and broadcast media. The print and broadcast sources are exemplified by newspapers, monthly magazines, and television or radio product reviews. These sources are monitored and reviewed in a time frame consistent with their publication for editorial events having significance to a defined customer. For example, a product review in which a product of the defined customer is featured or mentioned constitutes an editorial event having significance to said customer. Upon identifying an editorial event having significance to a defined customer the event will be recorded for inclusion in a database. An image of the editorial will be scanned and saved in the database together with an abstract of the editorial and index values for the editorial characteristics and quality factors. The information gathered includes a plurality of editorial characteristics and quality factors. The editorial characteristics include; editorial ID, Media Type, Markets, Publication/Program, Brand Name, Keywords, and Date. Quality Factors include; Visual Used, Retail Credit, Spokesperson Quote, Editorial Slant and Cover/Lead Story. The advertising, sales and editorial events gathered are then indexed for inclusion in an electronic database together with the characteristics, quality factors and an abstract of predefined portions thereof. The abstract of each editorial event can include a portion of the text from the editorial together with a synopsis of same, and any pictures or graphics appearing in the editorial.

It is contemplated that specialist marketing professionals who will be able to accurately assess the editorial characteristics and quality factor of each editorial will gather the information from each editorial event. The information will be saved in an electronic database in a predetermined format for transmitting, preferably via electronic means in order to maintain the newness of the data, to a website provider. The website provider will then make the data available to users via electronic access to the database as explained hereinafter. In this way marketing specialist will be able to select the most relevant portions of each editorial for inclusion in the database, which is tailored to each individual user.

The information gathered about the editorial events and stored in an electronic database is used as input to a computer program, (the software used to measure the performance of advertising, editorial and sales events executing in a computer system) for evaluating the value of each of said editorial references to said defined customer. The editorial events are evaluated by calculating a value for the Equivalent Ad Cost, Hotz Index and Publicity Value for each editorial event.

The Equivalent Ad Cost represents the cost of an advertisement of equivalent size or duration to a particular editorial event. It is calculated by multiplying the editorial characteristic Size/Duration by an Ad Rate for the appropriate media. The product of this calculation is the cost for purchasing an equivalent size or duration advertisement, which provides the user with a means to compare the public relations cost of said editorial event to the direct cost of an equivalent advertisement. This is useful for the marketing professional because it provides a basis by which to compare public relations and advertising expenditures.

The Hotz Index provides a measure of the value of editorial events as compared to advertising. It is well known and accepted in the retail industry that an unsolicited editorial mention of a product or brand makes a more powerful statement to a potential customer than a paid for advertisement. This is true because an editorial mention is perceived as impartial and therefore. provides a more believable assessment of product or brand than and advertisement. An editorial can have enhanced (for a positive editorial) or diminished (for a negative editorial) value as compared to an advertisement. However, the marketing professional could not previously codify the enhanced or diminished value of the editorial event. The Hotz Index provides that measure. The. Hotz Index is calculated by adding the values assigned to a plurality of quality factors for a particular editorial event, which include; Visual Used, Spokesperson Quote, Primary Focus, First Half, Retail Credit, Key Talk Points and Cover/Lead Story and multiplying said sum by the value assigned to the editorial slant for said editorial event. Clearly, the higher the value calculated for the Hotz Index the greater the added worth of the editorial event as compared to an advertisement.

The publicity value is the product of the Hotz Index multiplied by the Equivalent Ad Cost. The publicity value represents the value in dollars that a particular editorial event embodies, taking into account the cost for an equivalent size or duration of advertisement and the added or diminished worth of the editorial as expressed by the Hotz Index. A publicity value equal to the equivalent ad cost indicates an editorial having the same marketing value as an advertisement.

The gathered information regarding a particular or a plurality of editorial event, including the editorial characteristic, quality factors and the calculated evaluation indices described above for editorial events having significance to a user are made available to the user by electronic access to the database. The information available to the user provides different standards for the marketing professional to evaluate a particular editorial event or a plurality of events. As discussed below, a user is able to obtain a customized report containing that information. The reports available to the user are generated on the server by a program that executes the software embodying the present invention. The program generates the reports accordance with the user specified parameters selected on one of the search pages displayed to the user by the server. The search pages provide the user with a plurality of choices to select the parameters of the search desired. The users search parameters are passed to the server through an interface, which directs the program to gather data from the database containing the information regarding the editorial events, and then create a report in one of many formats for display by the server to the user. The reports contain HTML links that are generated dynamically by the program and allow the user to generate additional reports or access more detailed information.

While formal definitions may also implied by the usage of certain terms herein, within the context of this application, the following definitions are provided for the following words and terms.

| | |
|---|---|
| Advertising Event | A paid for advertisement, intended to promote the purchase of a particular product or increase the public awareness or perception of a product or brand. |
| Advertising Rate | The cost of purchasing an advertisement in a particular media. If the media type is television or radio, the appropriate time ad rate is used. If the media is newspapers, or magazines, the size (page) ad rate is used. Additionally, if the editorial event is in color (the color quality factor is true) then the color ad rate for print media is used; otherwise the black & white ad rate is used. |
| Editorial Event | unsolicited editorial publicity about a particular brand or product appearing in print or electronic media. |
| Editorial ID | a specific identifier, usually a number to identify a single editorial. |
| Sales Event | The purchase of a product or products. |
| Media Event | Unsolicited publicity about a particular brand or product appearing in print or electronic media. |
| Index Value | A calculated value that is a function of a plurality of editorial quality factor, which are independent variables. |
| Brand | A name recognized by one skilled in the art as referring to a particular product or groups of products. |
| Media Name | A particular outlet, medium, or the type of media, being the name of the media in which an editorial or media event appeared, usually a periodical or broadcast channel or station. |
| Issue/Air Date | The date on which a particular advertisement or editorial event first became available for public viewing or exposure. |
| Circulation | The number of copies of a periodical distributed to the public. |
| Dedicated Marketing Area | An area of concentration of consumers corresponding to a geographic area as defined by ACNielsen Corporation. |
| Location | The city or region in which an editorial, advertising or sales event occurs. |
| Journalist | The name of the commentator primarily responsible for composing an editorial or media event. |
| Size/Duration | The dimension or time length of the editorial or media event. The units will depend of the media type. Print media will be specified in pages or fractions thereof, while broadcast media will be specified in seconds. |
| Primary Focus | The chief theme of the advertisement or editorial or media event. |
| Cover/Lead | The first or most significant item portrayed in an advertisement or editorial or media event. |
| First Half | The first half of a program or publication. |
| Quote | A Boolean value indicating the presence of a direct verbatim excerpt regarding a product or brand appearing in an advertisement or editorial or media event. |
| Visual | A Boolean value indicating the presence of a graphic image depicting a product or brand of goods, appearing in an editorial or media event. |
| Retail Mention | A Boolean value indicating the presence of information appearing in an editorial or media event regarding the purchase of the product or goods |

-continued

| | |
|---|---|
| | appearing in the editorial or media event. |
| Editorial Slant | A numerical value assigned to an editorial or media event which characterizes the bias of the event wherein a value of: 1.25 indicates a positive bias, 1.0 indicates a neutral bias, and .5 indicates a negative bias. |
| Key | One or several keywords designated by a user to search for or in a particular editorial or media event. |

Referring now to the drawings, FIG. 1 is a block diagram illustrating an embodiment of the present invention. In order to access the present invention a user will run an Internet navigation program called a web browser 11 on his computer. Common examples are Netscape Navigator or Microsoft Internet Explorer. A Web browser contains the basic software needed to find, retrieve, view, and send information over the Internet allowing the user to access web servers located anywhere in the world to view information and obtain data. In the present invention the user connects to a server engine 13 through the use of a browser. The browser is directed to the server address over the Internet 12. The Internet address corresponding to the server is known as a uniform resource locator (URL) and represents the address of an Internet file. By entering the proper address, the users browser will be directed to the server that provides access to programs that embody the present invention.

The server uses the computer language Hypertext Markup Language (HTML) to create web pages that can be viewed by the user using the browser. HTML embodies the instructions for creating, formatting and linking documents that can be accessed by a browser for viewing by a user. HTML has the capability of connecting documents viewed by the user. The connections are made by way of hypertext, which is a word, string of words or graphic that directs the browser to another HTML document or invokes a program on the server. The server is able to invoke a program on the server through the use of a Common Gateway Interface (CGI). The CGI is a software gateway from the web server to programs outside the server. When a user clicks on a hypertext link on a HTML page that invokes a program on the server, the CGI passes any parameters defined by the user on the HTML document to the program.

The server or a separate database server runs the programs that embody the present invention. The program receives commands through the CGI and executes the program to generate the reports requested by the user. A variety of reports may be generated from the data stored in the Data Tables 14, which include; activitylog 14a, adkeyword 14b, adrates 14c, advertisement 14d, name/address 14e, brand 14f, company 14g, company_reports 14h, competitor 14i, dmarank 14j, editor 14k, editorial 14l, edkeyword 14m, keyword 14n, media 14o, next_ids 14p, report 14q, user 14r. The data tables contain information regarding each user and editorial. Each table contains a plurality of records, which each have at least one field for data pertaining to each entry in the data tables. In order to generate a report the user.specifies the parameters for the report on a search page, which are then passed to the server via the Internet and to the program embodying the present invention through the CGI. The data base program.then queries the database to obtain the information contained in the appropriate data fields. The program then generates a report containing the requested data responsive to the users request.

Figure 1A:
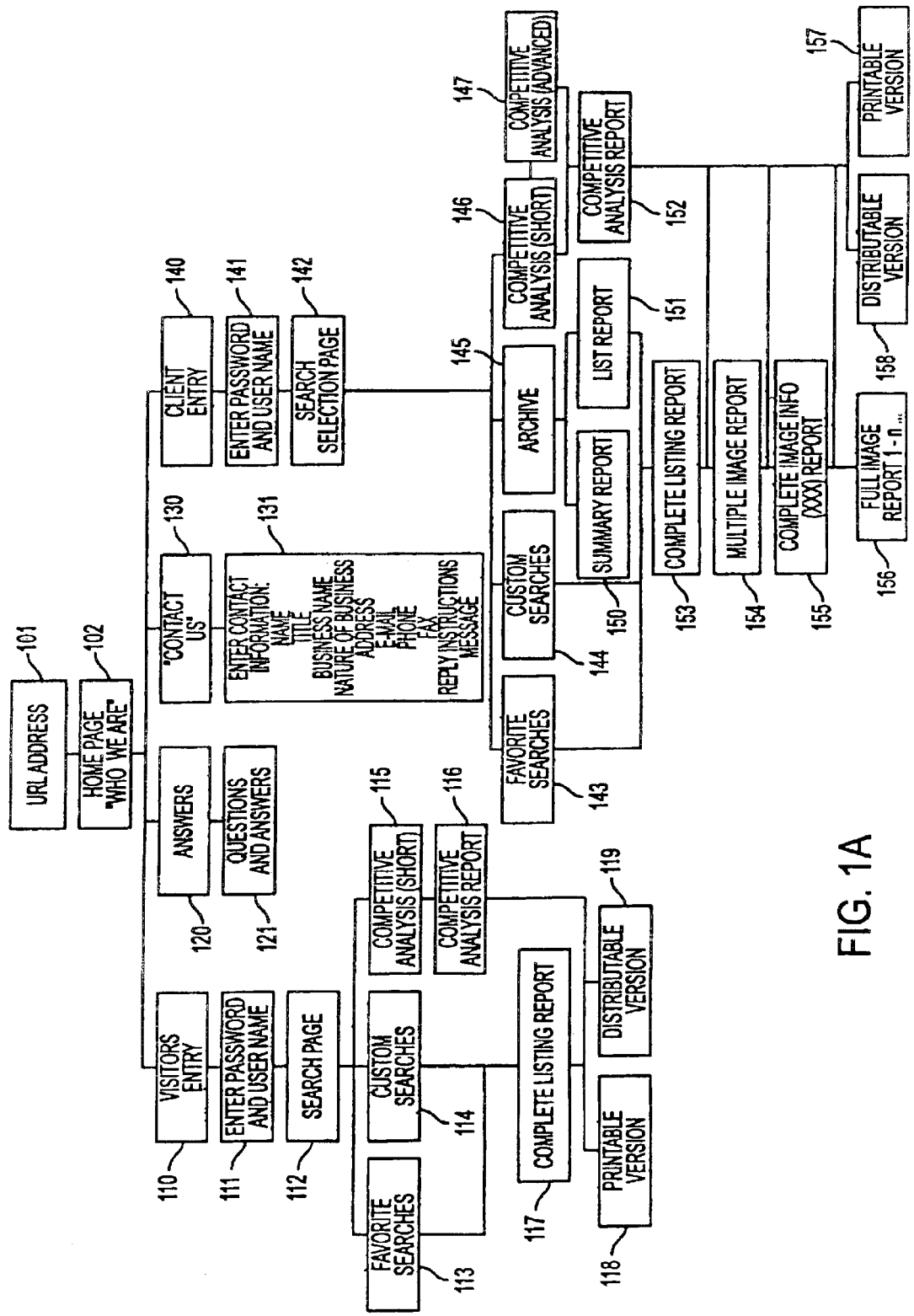
FIG. 1A is an exemplary flowchart that depicts the program embodying the present invention.

The block diagram of FIG. 1A illustrates an overview of an exemplary embodiment of the present invention. To access the programs employing the present invention, the user will begin by accessing a web site by entering a URL address 101 through a browser program with a keyboard. The web site will display introductory "Who We Are" home page 102 that presents background information regarding the present invention and prompts the user to click one of a plurality of buttons on the home page.

Figure 1B:
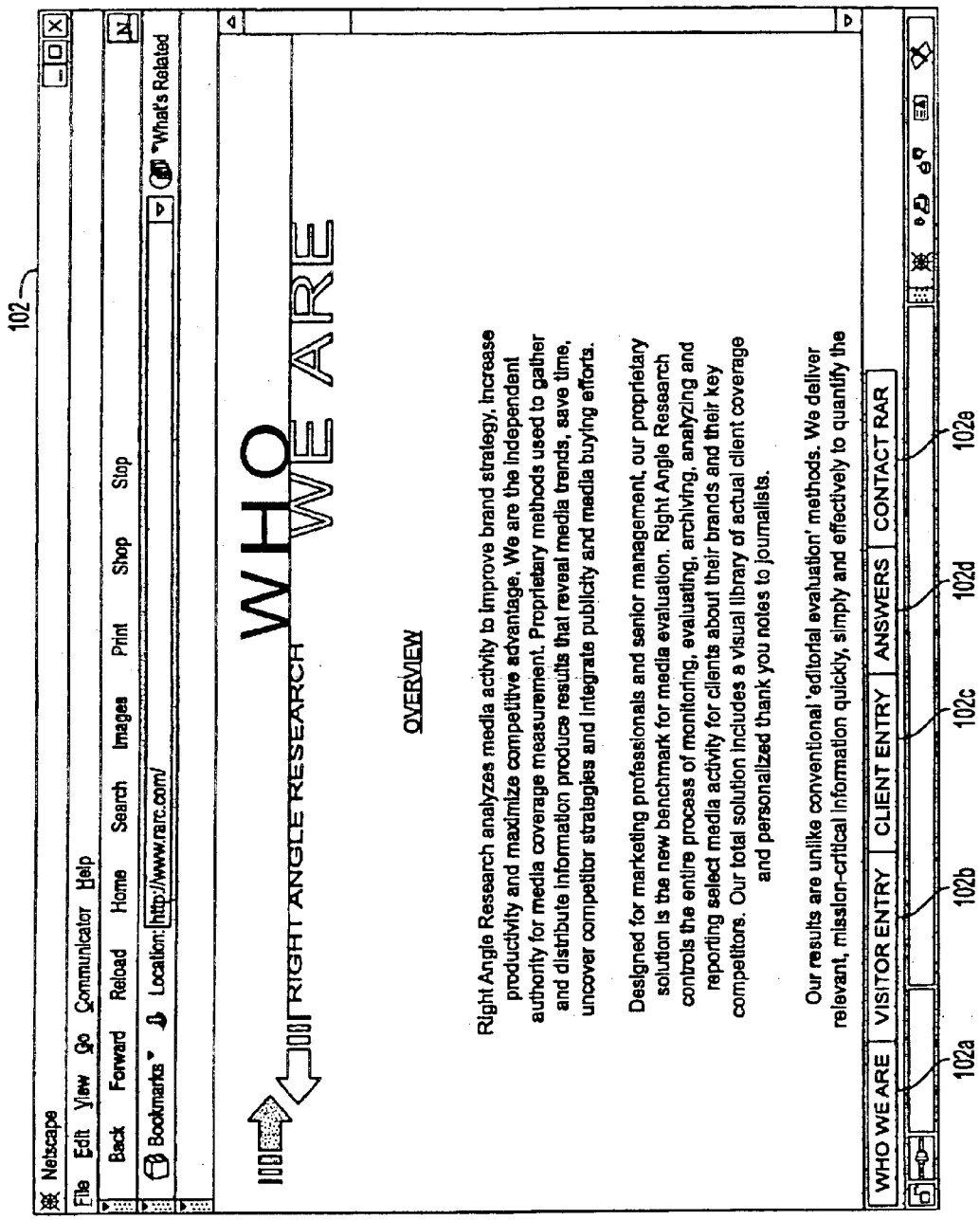
FIG. 1B is a depiction of an exemplary home page for the web site embodying the present invention.

FIG. 1B depicts an exemplary version of the home page. The home page contains buttons activate hidden links to the introductory pages for those areas. The buttons are; Who We Are, 102a, Visitors Entry 102b, Client Entry 102c, Answers 102d, and Contact 102e. The user can access those areas by clicking on those buttons.

Clicking on the Who We Are button 102a returns the user to the home page.

The Visitors Entry Button 102b, presents the user with an electronic form on which to enter, using an input device, his/her User Name and Password and a button to indicate that his/her User Name and Password has been entered. The Visitors Entry Page 110 provides access to a portion of the available reports in order to provide a potential user with a demonstration of the invention. A "Guest Company" is established for the purpose of allowing visitors to interact with the site in the way a client would. Upon clicking visitors entry button the visitor can access the Guest Company's area. This area is essentially identical to the Client Entry, but having instructional text on the screen geared towards a visitor rather than a client. The search pages available in the guest area include; Favorite Searches 113, Custom Searches 114, and Competitive Analysis 115. The Favorite Search page will have a list of a plurality of saved searches. In the case of the Visitors Entry these saved searches will be representative of the most common searches that an actual client would use. By selecting one of the Favorite Searches available the user will be presented with a Complete Listing Report 117. Also available to the user of the Visitors Entry will be Custom Searches 114. Upon clicking on the Custom Searches link on the Search Page the user will be able to utilize the Custom Search feature of the invention. Custom Searches allow the user to define the parameters of an editorial search. Finally the user in the guest area can select a competitive analysis. After specifying the type of search to perform, the program embodying the present invention will perform the search and generate a Competitive Analysis report 116 or a Complete Results Report 117 as appropriate.

The Client Entry Page 140 provides access for subscribed users to review reports pertaining to editorial events of significance to that customer. Clicking on the Client Entry Button 102c presents the user with an electronic form on which to enter, his/her User Name and Password and a button to indicate that his/her User Name and Password has been entered. By entering a valid user name and password the user is granted access to a plurality of searches available. As shown on FIG. 2, once the user has entered his/her user name and password the user is presented, in one embodiment, with a Search Page 142, which contains four hypertext links connecting to pages for each of the searches available. The searches available include Favorite Searches 143, Custom Searches 144, Archive 145, and a short form Competitive Analysis 146 and advanced Competitive Analysis 147. While the present invention is described in this embodiment as having four search options it is contemplated that more than four searches may be available for selection by the user.

By clicking on the Answers Button 102d the user will access a page 120 containing questions and answers regarding the present invention. The user will be able to view any one of the questions and answers presented by selecting from a plurality of links, or by scrolling through the list with a provided scroll bar.

By clicking on the Contact Us button 102e the user will access a contact page 130 containing a plurality of text boxes to enter contact information which can be used to provide the user with a way of communicating with the website or to provide additional information regarding the use of the invention. In one embodiment of the invention text boxes will be provided for Name, Title, Business Name, Nature of Business, Address, E-Mail, Phone Number, Fax Number, Reply Instructions, and Message.

Figure 2:
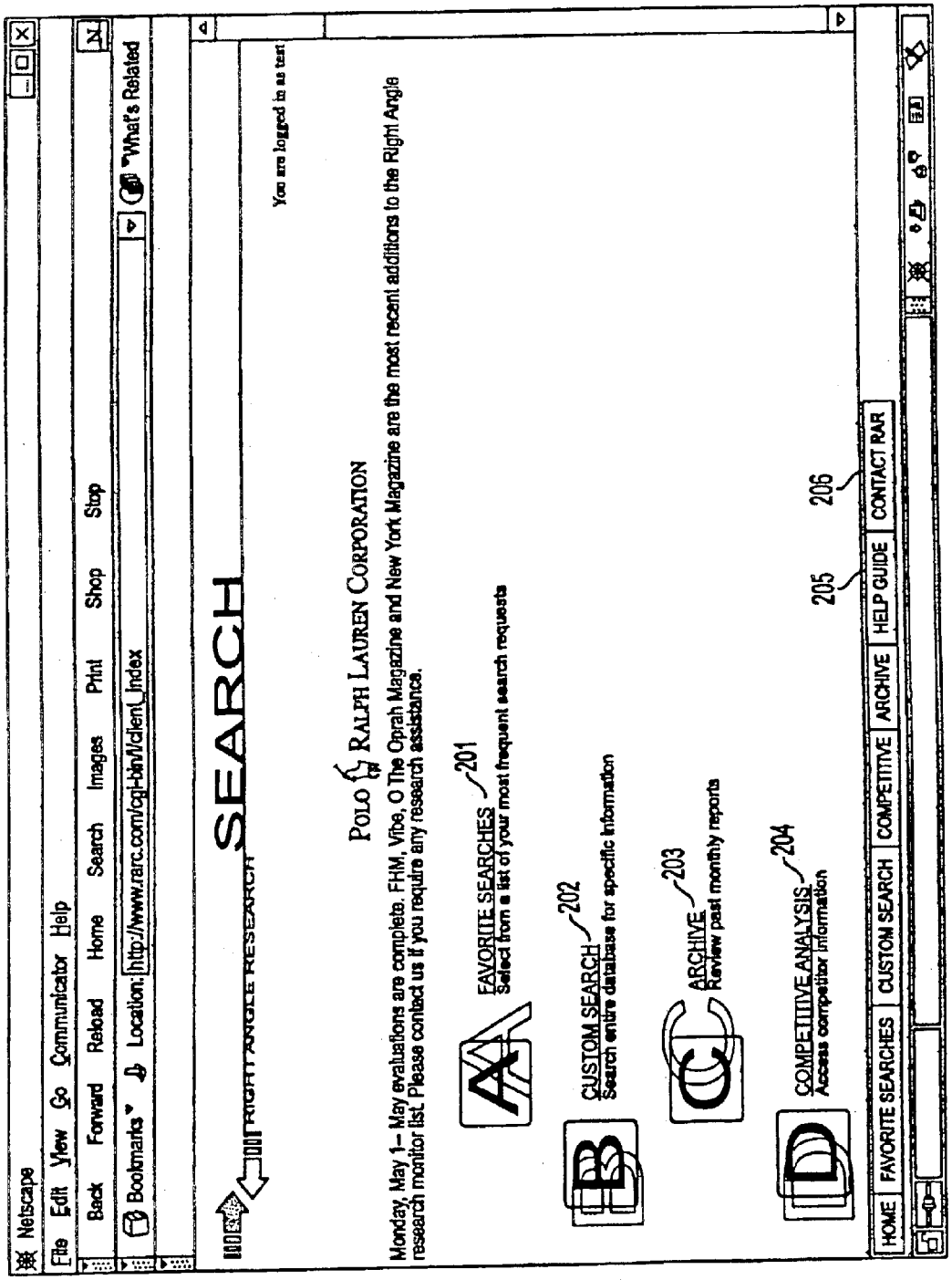
FIG. 2 is an exemplary web page of the present invention depicting a plurality of search options available to the user.

FIG. 2 depicts an exemplary search selection page, exhibiting links to each search available to the user. The user can perform any of the available searches by clicking on the appropriate link, which will cause the web server to retrieve the relevant search page and display same to the user. In addition to the searches available to the user on the search selection page in the Client Entry area, a user may also access a Help Guide by clicking on a Help button 205, on the bottom of the page and a Contact page by clicking on a Contact button 206, on the bottom of the page. The Help button will direct the user to a page that will display information that will assist clients in using the site. The Contact page in the Client Entry area is identical to the one in the public area, however the Name, Business Name, E-Mail and Phone Number fields are pre-filled for the user.

Figure 3:
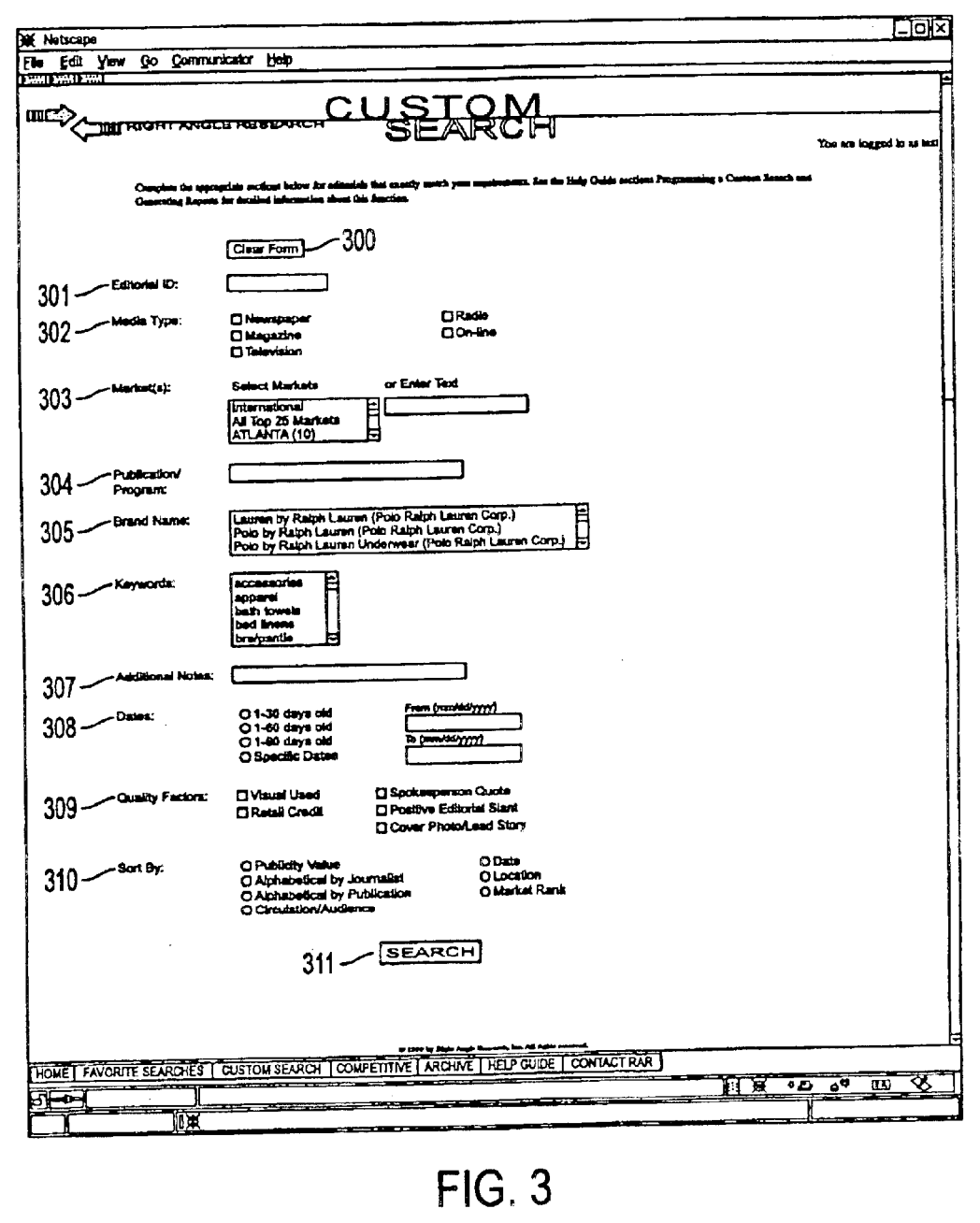

FIG. 3 depicts an exemplary search page. In the described embodiment as shown on FIG. 3, the user can elect to perform any one of the searches offered. A custom search allows the user to define a plurality of search parameters. A Favorite Search allows the user to perform a search where the search parameters have been preselected thereby decreasing the time and mouse clicks needed to perform said search. An Archive search provides the user with a comprehensive list of all editorial event references regarding the products or brands gathered to the database for that user. A Competitive Analysis provides the user with a report for all of the editorial events for the user's competing brands. While the search page is shown and described in relation to a Custom Search, it is contemplated that the selection and limitation of search parameters can be utilized in other searches contemplated by the present invention including an Archive Search or a Competitive Analysis.

The following is a more detailed description of each of the search options.

A user can perform a Custom Search by clicking on the Custom Search link 202 on the Search Selection Page. Upon accessing Custom Searches the user is presented with a screen as depicted in FIG. 3 wherein the user may limit the search by selecting one of the parameters as described below. After selecting the desired parameters the user can then instantiate a search by clicking a search button 311. For example, a user could specify a custom search for all references regarding a particular brand or all references appearing in a particular magazine. The user will also be able to view the report wherein the references are ranked according to the value of a selected index, such as Publicity Value. The parameters include the following editorial characteristics and quality factors which are explained in detail below.

Editorial ID 301
Media Type 302
Markets(s) 303
Publication/Program 304
Brand Name 305
Keywords 306
Additional Notes 307
Dates 308
Quality Factors 309
Sort 310

Editorial ID 301—The user may explicitly ask for a single editorial by specifying the editorial ID. If an ID is entered, all other search parameters are ignored.

Media Type 302—The user may limit the search results to specific media types by clicking on check boxes for newspaper, magazine, television, on-line and radio. If no media types are checked, the search results will not be limited based on media type.

Markets(s) 303—The user may limit the search results to editorials from certain markets. A multi-select listbox has entries for "International" and "All Top 25 Markets" in addition to individual entries for each of the top 25 markets. The user may select any combination of these, or enter a specific market name in the edit box. If an entry is made in the edit box, selections in the listbox are ignored. If no markets are selected, the search results will not be limited based on market.

Publication/Program 304—The user may limit the search results to editorials for specific media. All media whose name start with the text entered by the user will be returned in the search results. If no markets are selected, the search results will not be limited based on media name.

Brand Name 305—The user may limit the search results to editorials for specific brands. A1 of the client's paid brands will be listed. If no brands are selected, the search results will not be limited based on brand.

Keywords 306—The user may limit the search results to editorials that contain specific keywords. Editorials that contain any of the selected keywords will by returned unless more than one keyword is selected, then Editorials must contain both keywords to be returned as a search result. If no keywords are selected, the search results will not be limited based on keyword.

Additional Notes 307—The user can while performing research, enter notes in a Notes field regarding a particular editorial that will be saved in connection with said editorial. Search results can be limited to editorials that contain user-entered text in the Notes field.

Dates 308—The user may restrict the search results based on the Issue/Air date of the editorials Options include 1–30 days old, 1–90 days old, or a date range entered by the user. If a date range is not specified, the search results will not be limited based on Issue/Air date.

Quality Factors 309—The user may limit the search results to editorials that have one of the following quality factors: Visual Used, Retail Credit, Spokesperson Quote, Positive Editorial Slant, Cover/Lead Story. If no quality factors are checked, the search results will not be limited based on quality factors.

The user may also elect to sort the results by selecting one of the options presented as Sort By 310. The sorting can be done by publicity value, journalist (editor name), publication (media name), circulation/audience, date (issue/air), location (market), or market rank. If no sort is specified, the default sort order is by editorial ID. The user can also clear the form to begin a new search by clicking on the Clear Form button 312.

A user can perform a Favorite Search by clicking on the Favorite Search link 201 on the Search Selection Page. Favorite Searches provide a user with a plurality of user-defined searches that are available without the need to specify the search parameters. In that way the user can save those custom search reports most useful to their evaluation of editorial events for future reference. In order to perform a Favorite search a user selects Favorite Searches from the menu on the Search Selection Page. The user will then be presented with a menu of a plurality of saved searches on the Favorite Searches Page having user-defined parameters. By using a favorite search the user can minimize time and mouse clicks needed to obtain a search report and also those searches having most relevance to the user's needs.

A user can perform an Archive Search by clicking on the Archive Search link 203 on the Search Selection Page. Archive provides the user with a comprehensive list of all editorial event references regarding the products or brands gathered to the database for that user. The Archive link on the search selection page that will direct the user to the Archive Search Page 145. The user will be presented with a plurality of archived reports for the preceding months. The user can then chose to view either a summary report 150 or a List Report 151. The Summary Report provides the user with total values for Circulation, Number of editorial placements, top 25 market penetration and Public Relations Value for each of the media surveyed for all of the editorial events of significance to said user. The List Report, provides more detailed information for each editorial event archived. The information presented in the List Report is the same as that contained in a Complete Listing Report.

A Competitive Analysis provides a user with a summary report of a plurality of evaluation criteria for the editorial events of significance to a competing brand. A user can perform a Competitive Analysis by clicking on the Competitive Analysis link 204 on the Search Selection Page. Upon selecting said link, the user is directed to the "short form" version of the search parameter page. The purpose of this page is to allow the user to generate the report with a minimal number of mouse clicks. The user can specify a date range by either selecting one from a drop down menu or entering a specific range. The user may also limit the search results to editorials and ads for specific media types by selecting the appropriate check boxes. Since the date range and media types are the only parameters, the report will be generated for all of the given company's designated brands and all of their designated competing brands, with no market, quality factor or keyword restrictions. If the user would like to be more specific about the editorials and ads returned in the search results, they may click on the Advanced button to see all of the available report parameters. The Advanced Competitive Analysis provides the user with additional parameters with which to limit the analysis report. Upon clicking on the Advanced analysis button the user will be directed to the Advanced Competitive Analysis Page 147, where there are a plurality of parameters for limiting the search, including; Dates, Media Type, Your Brands, Competing Brands, Market(s), Keywords and Quality Factors 147g. The user may also specify an unlimited search by not limiting any parameters.

In response to any of the above search requests the user will receive a formatted electronic report. The reports available to the user are Complete Listing Report 153, Multiple Image Report 154, Complete Image Information Report 155 and Full Image Report 156. While the available report options are shown and described in relation to a Custom Search, it is contemplated that the reports generated by the other searches available to the user will be of like format to the report shown and described herein. In addition, the user is able to download each of the available reports in one or more preselected formats suitable for editing within commercially available database, spreadsheet or word processing applications such as Access, Excel or Word.

Figure 4:
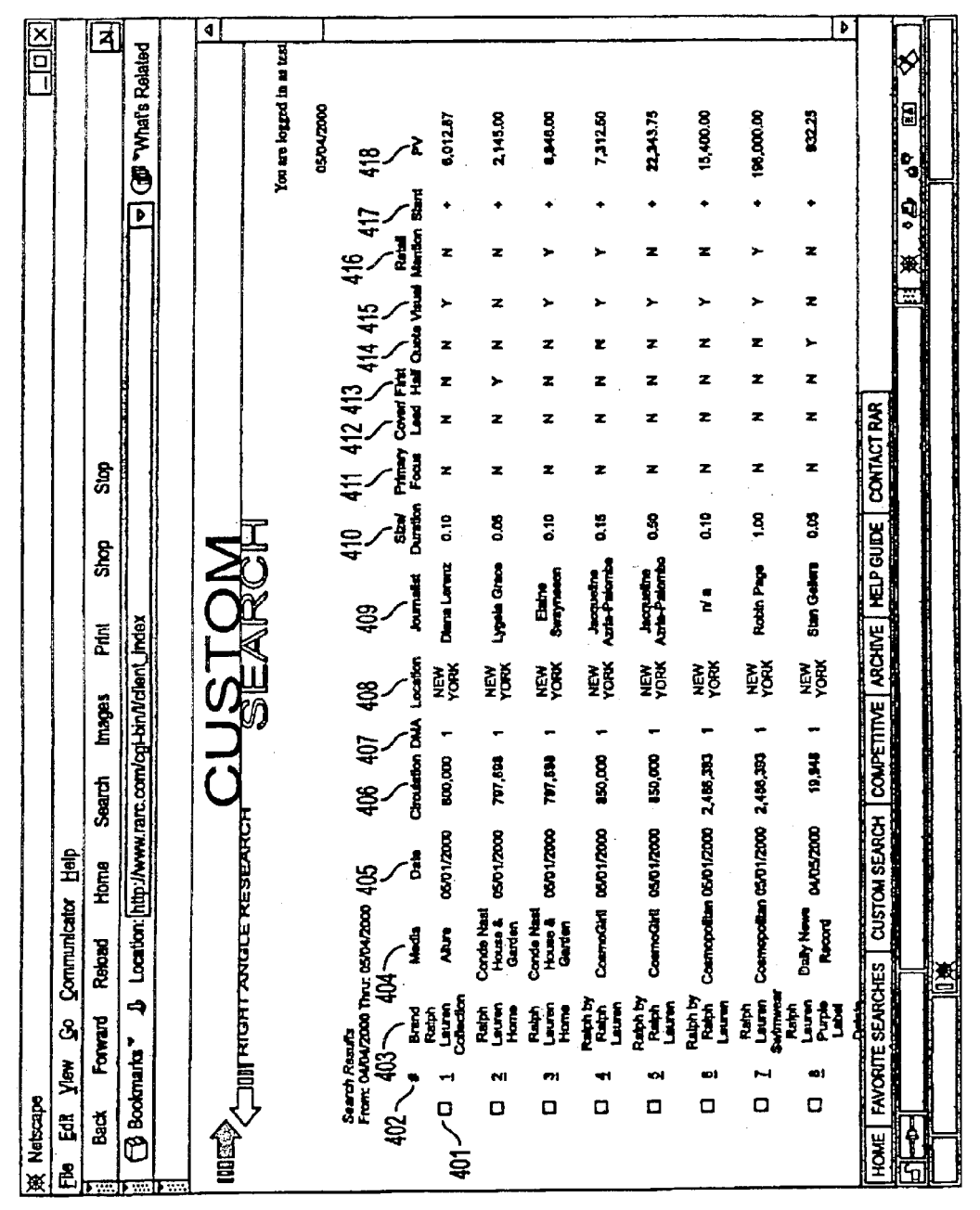

The Complete Listing Report is the default format for search results from a Favorite Search or a Custom Search. As shown on the version depicted in FIG. 4, the following information is displayed on this report; Brand Name 403, Media 404, Date 405, Circulation 406, Dedicated Market Rank (DMA) 407, Location 408, Journalist 409, Size/Duration 410, Primary Focus 411, Cover/Lead 412, First Half 413, Quote 414, Visual 415, Retail Mention 416, Slant 417 and Publicity Value 418. Editorial Slant is displayed with a "+" to denote a positive slant, a "−" to denote a negative slant and a "0" for neutral. Also included are sequential numbers 402 at the beginning of each editorial listing. These numbers are links to a report index number, explained below, for that particular editorial. In addition, each row has a check box at the beginning 401. The user may filter out rows (editorials) of the search results by placing a check in the check box in front of the rows that they wish to remove and then clicking on one of the buttons at the bottom of the page to generate a filtered Complete Listing Report, or a Multiple Image Report, consisting of only the selected editorials.

Figure 4A:
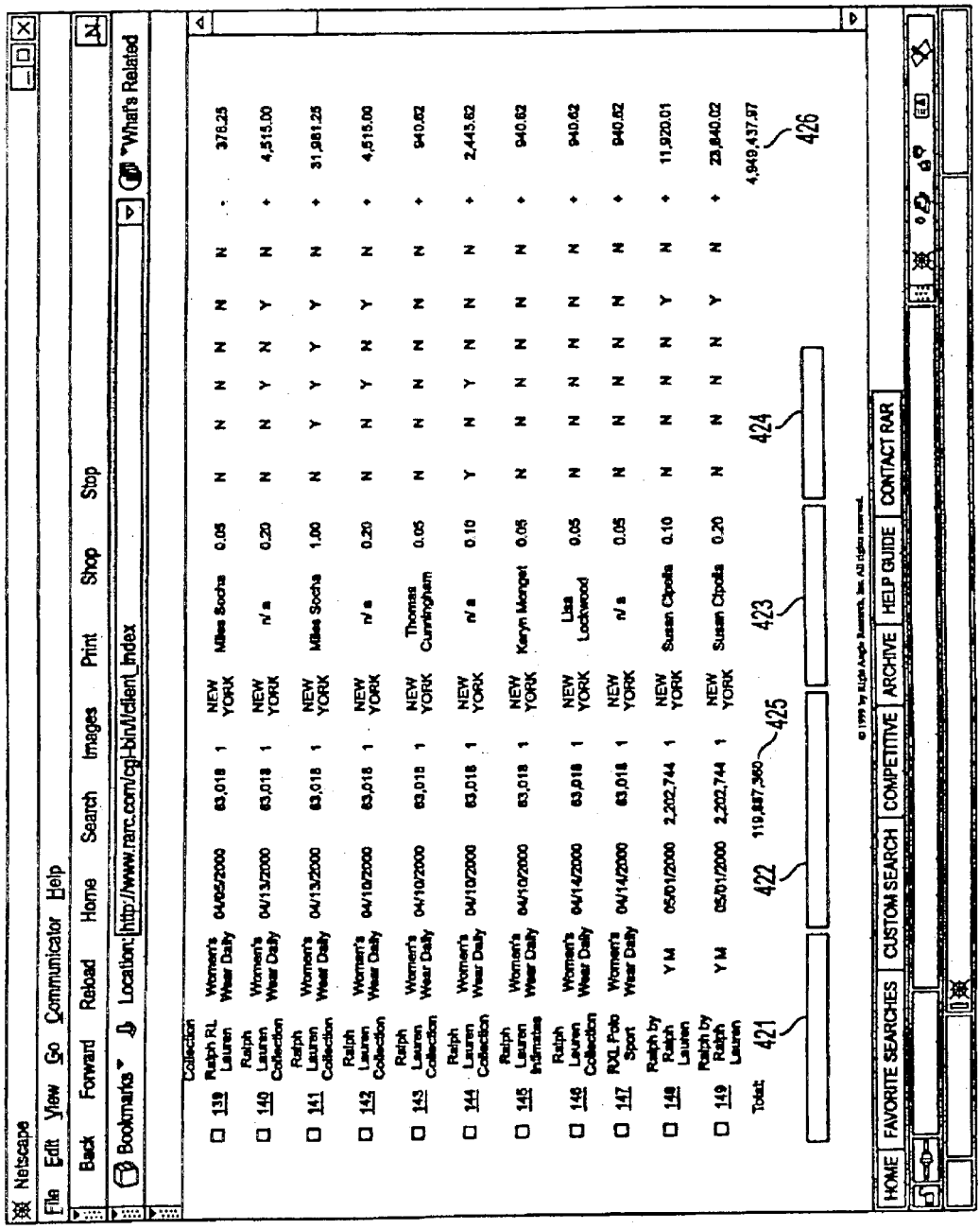
FIG. 4A is an exemplary web page of the present invention wherein depicting a search report.

FIG. 4A depicts a continuation of a Complete Results version report displaying the bottom of the columns described above, having buttons to select a filtered Complete Results Version 422, a Multiple Image Version 421, a Distributable Version 423 of the current report, which is the current report formatted for distribution by E-Mail or a Printable Version 424, to generate a version of the current report formatted for printing. FIG. 4A also includes a Total value for the Circulation 425 and Publicity Value (PV) 426 columns to aid the user in analyzing the performance of the editorial events contained in the report.

The Competitive Analysis Report is provided in response to either an short form or advanced competitive analysis search. The report provides the following information. Company, Brand, Credit, Full Page, Editorial Total, Feature, Cover, Publicity Value, Hotz Index, Ad Pages. The user can view specific editorials that comprise a report row by clicking on a number in the Editorial Total Column. This will display the Complete Listing Report. This link is only enabled for rows that represent the users own brands. Also, each media listed in the report will have a check box next to its name. The user may remove media for the report by checking the box next to the media's name and then clicking on a "Filter Results" button at the bottom on the report.

The Multiple Image Report may be generated from the results of a Complete Listing Report by clicking on the Multiple Image button 421, on the bottom of the page of the Complete Listing Report. The following information is displayed on this report Media 503, Date 504, Size/Duration 505, Primary Focus 506, Cover/Lead 507, First Half 508, Quote 509, Visual 510, Retail Mention 511, Slant 512, Publicity Value (PV) 513 and a thumbnail image 514 of each editorial. If an editorial has multiple images, the thumbnail is the first of the images uploaded. As in the Complete Listing Report, also included are sequential numbers 502 at the beginning of each editorial listing which are links to the report index number explained below, for that particular editorial. These numbers are links to the Report index number, explained below, for that particular editorial. In addition, each row has a check box 501 at the beginning for filtering rows (editorials) as in the Complete Listing Report. Checks may be used for inclusion or exclusion as desired.

Figure 5:
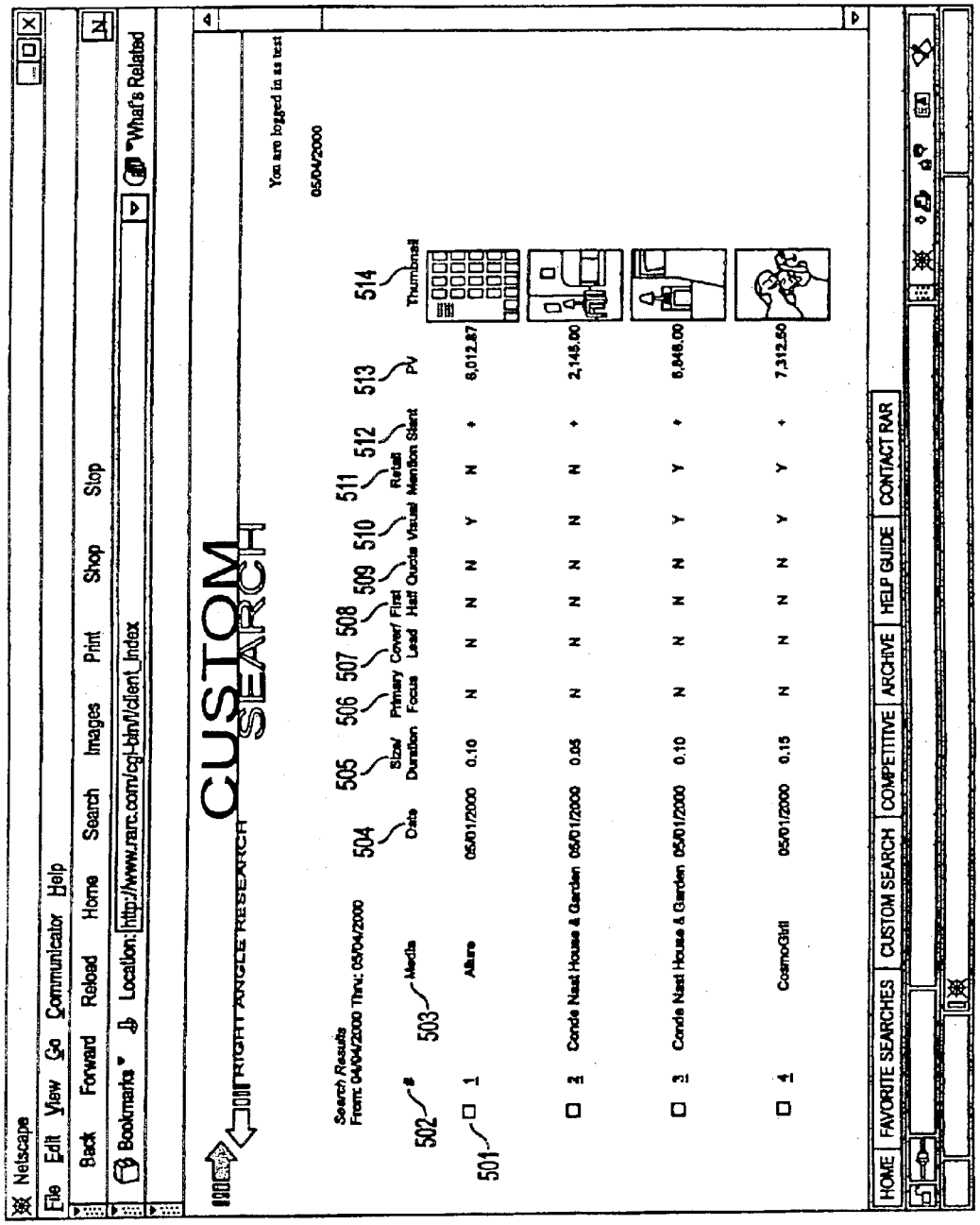
FIG. 5 is an exemplary web page of the present invention wherein depicting the results of a search.
Figure 5A:
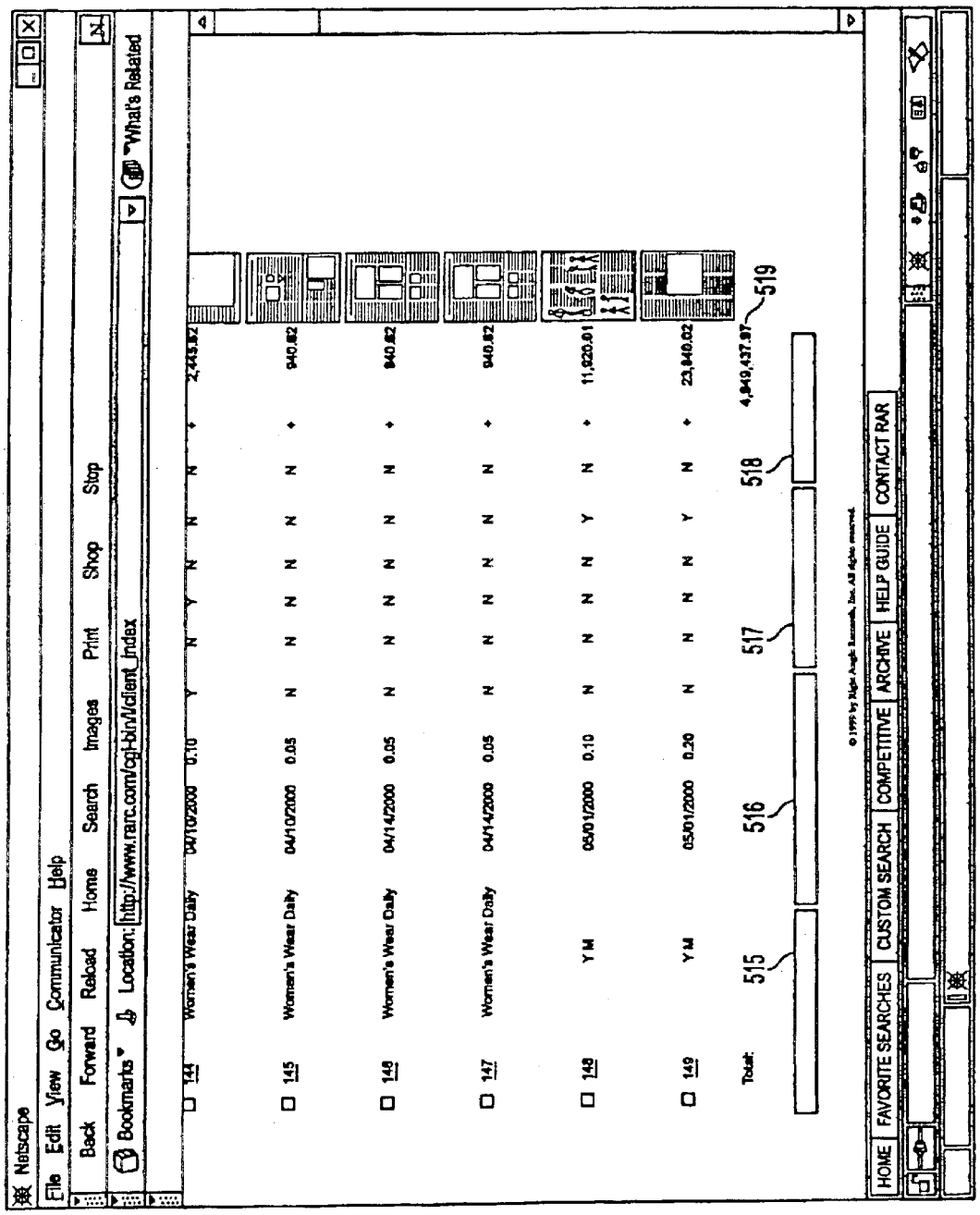
FIG. 5A is an exemplary web page of the present invention wherein depicting a search report.

FIG. 5A depicts a continuation of a Multiple Image Report displaying the bottom of the columns described above, having buttons to select a filtered Complete Results Version 516, a Multiple Image Version 515, a Distributable Version 517 of the current report, which is the current report formatted for distribution by E-Mail or a Printable Version 518, to generate a version of the current report formatted for printing. FIG. 5A also includes a Total value for the Publicity Value (PV) 519 columns to aid the user in analyzing the performance, of the editorial events contained in the report.

A Report for a particular editorial can be generated from either the Complete Listing Report or the Multiple Image Report by clicking on the appropriate link for a particular editorial. This Report then displays summary information about the given editorial, a thumbnail image and OCR text of the editorial and links to other images associated with the editorial if more than one. The thumbnail image displayed as part of this Report, is also a link to a full-size image of that thumbnail. Both the thumbnail and full-size image are of such a size that the text of the editorial portrait is not visible to the viewer.

The Full Image Report can be generated from any individual Report by clicking on the thumbnail image presented in the Report which activate hidden links to the full image of the editorial chosen or on the editorial number contained in column 402 or 502.

The reports available to the user from the present invention as previously described therefore provide a user with data regarding advertising, public relations and sales from a sole source. The user is able to access reports regarding marketing programs for a plurality of companies occurring in diverse geographical areas over a user-defined period of time. The user can customize and filter the report results in order to view only that data having the most significance to that user.

In addition the user can generate customized thank you and contact letters to editors based on the report results by selecting a particular editorial listing in a report and then generating a customized letter based on the contact information for the editor of the selected editorial. The report generator can save a plurality of letterforms so that a user can efficiently maintain contact with these individuals whose editorials are related to their products or brands.

Marketing professionals are thus able through the use of the present invention to measure the relative and absolute value of a public relations event with respect to advertising and product sales to achieve improved brand management, and increased productivity. The present invention provides the marketing professional with the tools to simply and effectively quantify the contribution of marketing programs to corporate growth and gain new insights about their core markets, media and competitors with fresh perspectives unavailable from any other source.

Through the use of the reports available to the marketing professional in the present invention, several benefits can be realized, including improved brand management, increased productivity and maximization of marketing investment. Specifically, the marketing professional can improve brand management through the use of the Reports by: Monitoring competitors, Viewing the entire competitive market, Benchmarking editorial performance against past results, Tracking relationship of advertising placement to editorial support, Integrating PR and media planning strategies, Speak with editors and publishers based on validated information from independent authority, Targeting results by product category for pinpoint accuracy, Evaluating factors influencing editorial performance such as quantity, quality, publicity value, ad pages, media, type of story (business, feature, etc) and Keeping control of increasing areas of business activity (jewelry, swimwear)

The marketing professional can increase productivity through the use of the Reports by: Receiving instant credit reports as they happen, Receiving updated information daily, (all results in by first of month), Manage editor contact with personalized thank you notes, Providing immediate response to requests for information, Controlling system access, either consolidate or delegate, Distributing results via email or print reports for viewing, Reducing or eliminating tagging, Using time and labor to become proactive brand managers, Viewing visuals and relevant text of your editorials The marketing professional can maximize marketing investment through the use of the Reports by: Quantifying the value of editorial coverage, Measuring dollar return of publicity efforts for company, Making reports accessible by all authorized users, Generating Reports and analysis for management meetings, presentations and strategic decision making, Creating regular summaries and reports for key individuals and groups (sales, celebrity, corporate, retail), Centralize global news coverage for users worldwide, Gaining immediate understanding of editorial coverage and value returned to company, Measuring productivity for management to support future activities Therefore, a user can have increased efficiency in performing marketing research. Furthermore, the present invention provides the marketing professional with means to accurately compare the value of a plurality of marketing campaigns for a particular company, product, brand, or geographic region in accordance with the information the user requires. The user is therefore able to precisely assess the value of a particular public relations event or events in comparison to other public relations events or to purchased advertisements. Finally, the present invention provides the user with immediate electronic access to the performance measurements of public relations events from diverse locations around the globe As will be understood by those of ordinary skill in the art that while the embodiment described herein presents the present invention as being accessed over the Internet using the World Wide Web, access could also be provided by software executing on a customers personal or laptop computer accessing a portable media storage device or through a centrally located computer accessed by a customer electronically using a remote computer over an Intranet or via a remote computer using a direct dial connection.

While the invention has been particularly shown and described with respect to a preferred embodiment thereof, it will be understood by those skilled in the art that the foregoing and other changes in form and details may be made therein without departing from the spirit and scope of the invention.

What is claimed is:

1. A method of doing business to provide value added relevance to marketing information comprising:

a) gathering a plurality of advertising, sales and editorial events having significance to a defined customer, b) indexing said advertising, sales and editorial events for an electronic database and abstracting predefined portions thereof in said electronic database, c) evaluating the value of each of said advertising, sales and editorial events to said defined customer in said electronic database, d) providing said defined customer with electronic access to said electronic database; and e) generating at least one report on a computer for said defined customer using said electronic database summarizing a plurality of advertising sales and editorial events for providing performance measurements of public relations, advertising and sales events to said defined customer in order to provide value added relevance to marketing information, f) wherein an index value is calculated using a computer based upon a plurality of editorial characteristics and quality factors for evaluating the value of the editorial event, g) wherein the index value includes a Comparative Editorial to Advertising Value, Equivalent Ad Cost and Publicity Value.

2. The method of doing business of claim 1 wherein the electronic database is a relational database.

3. The method of doing business of claim 2 wherein the electronic database includes text and graphics files.

4. The method of doing business of claim 1 wherein the abstracting is by creating a synopsis of the editorial event to include text and graphics from the editorial event.

5. The method of doing business of claim 1 wherein the steps of evaluating a value of the editorial events further includes; selecting one of said editorial quality factors or index values, comparing the value of said selected editorial quality factor or index value for all editorial events and ranking the editorial events in order of the value of the editorial quality factors or index value.

6. A method of doing business to provide value added relevance to marketing information comprising:

a) gathering a plurality of advertising, sales and editorial events having significance to a defined customer, b) indexing said advertising, sales and editorial events for an electronic database and abstracting predefined portions thereof in said electronic database, c) evaluating the value of each of said advertising, sales and editorial events to said defined customer in said electronic databases, d) providing said defined customer with electronic access to said electronic database; and e) generating at least one report on a computer for said defined customer using said electronic database summarizing a plurality of advertising sales and editorial events for providing performance measurements of public relations, advertising and sales events to said defined customer in order to provide value added relevance to marketing information, f) wherein an index value is calculated using a computer based upon a plurality of editorial characteristics and quality factors for evaluating the value of the editorial event, and g) wherein the editorial characteristics and quality factors for evaluating the editorial event to calculate an index value include Brand, Media Name, Issue/Air Date, Circulation, Dedicated Marketing Area, Location, Journalist, Size/Duration, Primary Focus, Cover/Lead, First-Half, Quote, Visual, Retail Mention, and Editorial Slant.

7. The method of doing business of claim 6 wherein the index value is determined by assigning a value to the plurality of quality factors, assigning a value to the Editorial Slant, adding the values assigned to each quality factor to determine an editorial quality factor total and multiplying the editorial quality factor total by the Editorial Slant.

8. The method of doing business of claim 6 wherein the index value is an Equivalent Ad Cost, said Equivalent Ad Cost determined by assigning a value to an advertising rate, assigning a value to the Size/Duration, and multiplying the advertising rate by the Size/Duration.

9. The method of doing business of claim 6 wherein the index value is a Publicity Value that is determined by multiplying an Equivalent Ad Cost value by a Comparative Editorial to Advertising Value, said Equivalent Ad Cost determined by assigning a value to an advertising rate, assigning a value to the Size/Duration, and multiplying the advertising rate by the Size/Duration, and said Comparative Editorial to Advertising Value determined by assigning a value to the plurality of quality factors, assigning a value to the Editorial Slant, adding the values assigned to each quality factor to determine an editorial quality factor total and multiplying the editorial quality factor total by the Editorial Slant.

10. The method of claim 1 or 6 wherein providing electronic access to the electronic database is afforded by software executing on a customers personal or laptop computer accessing a portable media storage device.

11. The method of claim 1 or 6 wherein providing electronic access to the electronic database is afforded by a centrally located computer accessed by a customer electronically using a remote computer.

12. The method of doing business of claim 1 wherein the centrally located computer is accessed by a customer electronically using a remote computer via a direct dial connection.

13. The method of claim 1 wherein the centrally located computer is accessed by a customer electronically using a remote computer via an Intranet.

14. The method of evaluating multiple advertising, media and sales events for evaluating their public relations significance comprising:

a) selectively gathering and summarizing a plurality of media references for electronic access by one or more customers, b) indexing each of said media events in an electronic database and abstracting a portion thereof for remote electronic access by said one or more customers, c) evaluating each of said media references using a computer for determining an index value which corresponds to a public relations value, d) generating at least one defined set of report parameters on a computer using said electronic database for each of said one or more customers, and e) providing selective electronic access to said electronic database and said defined set of report parameters for each of said customers for purposes of evaluating multiple advertising media and sales events and their public relations significance, f) wherein the index value includes a Comparative Editorial to Advertising Value, Equivalent Ad Cost and Publicity Value.

15. The method of evaluating multiple media events of claim 14 wherein the index value is a Publicity Value, said Publicity Value is determined by multiplying an Equivalent Ad Cost value by the Comparative Editorial to Advertising Value, said Equivalent Ad Cost being determined by assigning a value to an advertising rate, assigning a value to an advertisement size or duration, and multiplying the values assigned to the advertising rate by the advertisement size or duration respectively, and said Comparative Editorial to Advertising Value being determined by assigning a value to a plurality of editorial quality factors, assigning a value to an editorial slant, adding the values assigned to each editorial quality factor to determine an editorial quality factor total and multiplying the editorial quality factor total by the editorial slant value.

16. The method of evaluating multiple media events of claim 14 wherein the electronic database is a relational database.

17. The method of evaluating multiple media events of claim 14 wherein the electronic database includes text and graphics files.

18. The method of evaluating multiple media events of claim 14 wherein the abstracting is by creating a synopsis of the editorial event to include text and graphics from the editorial event.

19. The method of evaluating multiple media events of claim 14 wherein evaluating a value of the editorial events comprises the steps of; selecting one of said editorial quality factors or index values, comparing the value of said selected editorial quality factor or index value for all editorial events and ranking the editorial events in order of the value of the editorial quality factors or index value.

20. A method of evaluating multiple advertising, media and sales events for evaluating their public relations significance comprising:
   a) selectively gathering and summarizing a plurality of media references for electronic access by one or more customers,
   b) indexing each of said media events in an electronic database and abstracting a portion thereof for remote electronic access by said one or more customers,
   c) evaluating each of said media references for determining an index value which corresponds to a public relations value,
   d) generating at least one defined set of report parameters on a computer using said electronic database for each of said one or more customers, and
   e) providing selective electronic access to said electronic database and said defined set of report parameters for each of said one or more customers for purposes of evaluating multiple advertising, media and sales events and their public relations significance,
   f) wherein the editorial characteristics and quality factors for evaluating an editorial event to calculate an index value include Brand, Media Name, Issue/Air Date, Circulation, Dedicated Marketing Area, Location Journalist, Size/Duration, Primary Focus, Cover/Lead, First Half, Quote, Visual, Retail Mention, Editorial Slant.

21. A method of evaluating multiple advertising, media and sales events for evaluating their public relations significance comprising:
   a) selectively gathering and summarizing a plurality of media references for electronic access by one or more customers,
   b) indexing each of said media events in an electronic database and abstracting a portion thereof for remote electronic access by said one or more customers,
   c) evaluating each of said media references using a computer for determining an index value which corresponds to a public relations value,
   d) generating at least one defined set of report parameters on a computer from said electronic database for each of said one or more customers, and
   e) providing selective electronic access to said electronic database and said defined set of report parameters for each of said one or more customers for purposes of evaluating multiple advertising, media and sales events and their public relations significance,
   f) wherein the index value is determined by assigning a value to a plurality of editorial quality factors, assigning a value for an editorial slant, adding the values assigned to each editorial quality factor to determine an editorial quality factor total and multiplying the editorial quality factor total by the editorial slant value.

22. A method of evaluating multiple advertising, media and sales events for evaluating their public relations significance comprising:
   a) selectively gathering and summarizing a plurality of media references for electronic access by one or more customers,
   b) indexing each of said media events in an electronic database on a computer and abstracting a portion thereof for remote electronic access by said one or more customers,
   c) evaluating each of said media references on a computer for determining an index value which corresponds to a public relations value,
   d) generating at least one defined set of report parameters on a computer from said electronic database for each of said one or more customers, and
   e) providing selective electronic access to said electronic database and said defined set of report parameters for each of said one or more customers,
   f) wherein the index value is an Equivalent Ad Cost that is determined by assigning a value to an advertising rate, assigning a value to an advertisement size or duration, and multiplying the value assigned to the advertising rate by the advertisement size or duration respectively.

23. A system for evaluating the public relations significance of a plurality of media, sales and advertising events to a defined subscriber, said system comprising:
   a) a relational database of selected media events on a computer, said database including i) a plurality of fields for each event ii) one or more abstracts of each event iii) at least one key for each defined subscriber,
   b) means for calculating an index value for each of said media events using a computer to enable said defined subscriber to evaluate the public relations significance of each media event,
   c) a report generator for generating one or more predefined reports at one or more defined locations for each defined subscriber,
   d) a plurality of electronic display devices at said one or more of each defined locations for requesting and viewing said predefined reports by each defined subscriber, and
   e) electronic distribution of said database to said one or more defined locations,
   f) wherein the media events are selected from the group comprising; print media articles and images, radio broadcasts, television broadcasts, and on-line articles and images, and
   g) wherein the plurality of fields for each event are selected from the group comprising; Brand, Media Name, Issue/Air Date, Circulation, Dedicated Marketing Area, Location Journalist, Size/Duration, Primary Focus, Cover/Lead, First Half, Quote, Visual, Retail Mention, Slant, Comparative Editorial to Advertising Value, Equivalent Ad Cost and Publicity Value.

24. The system of claim 23 wherein said index value is calculated from a plurality of editorial characteristics and quality factors for evaluating an editorial event.

25. The system of claim 23 wherein providing electronic access to the electronic database is afforded by software executing on a subscriber's personal or laptop computer accessing a portable media storage device.

26. The system of claim 23 wherein providing electronic access to the electronic database is afforded by a centrally located computer accessed by a subscriber electronically using a remote computer.

27. The system of claim 26 wherein the centrally located computer is accessed by a subscriber electronically using a remote computer via a direct dial connection.

28. The system of claim 26 wherein the centrally located computer is accessed by a subscriber electronically using a remote computer via an Intranet.

29. The system of claim 26 wherein the centrally located computer is accessed by a subscriber electronically using a remote computer via the Internet.

30. A system for evaluating the public relations significance of a plurality of media, sales and advertising events to a defined subscriber, said system comprising:
   a) a relational database of selected media events on a computer, said database including i) a plurality of fields for each event ii) one or more abstracts of each event iii) at least one key for each defined subscriber,
   b) means for calculating an index value using a computer for each of said media events to enable said defined subscriber to evaluate the public relations significance of each media event,
   c) a report generator for generating one or more predefined reports at one or more defined locations for each defined subscriber,
   d) a plurality of electronic display devices at said one or more defined locations for requesting and viewing said predefined reports by each defined subscriber, and
   e) electronic distribution of said database to said one or more defined locations,
   f) wherein the calculated index value includes a Comparative Editorial to Advertising Value, Equivalent Ad Cost and Publicity Value.

31. The system of claim 30 wherein the index value is a Publicity Value, said Publicity Value calculated by multiplying an Equivalent Ad Cost value by the Comparative Editorial to Advertising value,
   said Equivalent Ad Cost being calculated by assigning a value to an advertising rate, assigning a value to an advertisement size or duration, and multiplying the values of the advertising rate by the advertisement size or duration respectively, and
   said Comparative Editorial to Advertising being calculated by assigning a value to a plurality of editorial quality factors, assigning a value to an editorial slant, adding the values assigned to each editorial quality factor to determine an editorial quality factor total and multiplying the editorial quality factor total by the editorial slant value.

32. A system for evaluating the public relations significance of a plurality of media, sales and advertising events to a defined subscriber, said system comprising:
   a) a relational database of selected media events on a computer, said database including i) a plurality of fields for each event ii) one or more abstracts of each event iii) at leas one key for each defined subscriber,
   b) means for calculating an index value using a computer for each of said media events to enable said defined subscriber to evaluate the public relations significance of each media event,
   c) a report generator for generating one or more predefined reports at one or more defined locations for each defined subscriber,
   d) a plurality of electronic display devices at said one or more defined locations for requesting and viewing said predefined reports by each defined subscriber, and
   e) electronic distribution of said database to said one or more defined locations,
   f) wherein the editorial characteristics and quality factors for evaluating an editorial event to calculate an index value include Brand, Media Name, Issue/Air Date, Circulation, Dedicated Marketing Area, Location Journalist, Size/Duration, Primary Focus, Cover/Lead, First Half, Quote, Visual, Retail Mention, and Editorial Slant.

33. A system for evaluating the public relations significance of a plurality of media, sales and advertising events to a defined subscriber, said system comprising:
   a) a relational database of selected media events on a computer, said database including i) a plurality of fields for each event ii) one or more abstracts of each event iii) at least one key for each defined subscriber,
   b) means for calculating an index value using a computer for each of said media events to enable said defined subscriber to evaluate the public relations significance of each media event,
   c) a report generator for generating one or more predefined reports at one or more locations for each defined subscriber,
   d) a plurality of electronic display devices at said one or more locations for requesting and viewing said predefined reports by each defined subscriber, and
   e) electronic distribution of said database to said one or more locations,
   f) wherein the index value is calculated by assigning a value to a plurality of editorial quality factors, assigning a value to an editorial slant, adding the values assigned to each editorial quality factor to determine an editorial quality factor total and multiplying the editorial quality factor total by the editorial slant value.

34. A system for evaluating the public relations significance of a plurality of media, sales and advertising events to a defined subscriber, said system comprising:
   a) a relational database of selected media events on a computer, said database including i) a plurality of fields for each event ii) one or more abstracts of each event iii) at least one key for each defined subscriber,
   b) means for calculating an index value using a computer for each of said media events to enable said defined subscriber to evaluate the public relations significance of each media event, c) a report generator for generating one or more predefined reports at one or more locations for each defined subscriber, d) a plurality of electronic display devices at said one or more locations for requesting and viewing said predefined reports by each defined subscriber, and e) electronic distribution of said database to said one or more locations, f) wherein the index value is an Equivalent Ad Cost calculated by assigning a value to an advertising rate, assigning a value to an advertisement size or duration, and multiplying the values of the advertising rate by the advertisement size or duration respectively.

* * * * *